(No Model.)

A. E. HOFFMAN.
SAW STRAIGHTENING MACHINE.

No. 315,033. Patented Apr. 7, 1885.

Witnesses:
Frank L. Blanchard
L. M. Freeman

Inventor:
A. E. Hoffman.
By D. B. Coupland & Co.
Attorneys.

UNITED STATES PATENT OFFICE.

ANDREW E. HOFFMAN, OF FORT WAYNE, INDIANA.

SAW-STRAIGHTENING MACHINE.

SPECIFICATION forming part of Letters Patent No. 315,033, dated April 7, 1885.

Application filed July 1, 1884. (No model.)

*To all whom it may concern:*

Be it known that I, ANDREW E. HOFFMAN, of Fort Wayne, county of Allen, and State of Indiana, have invented certain new and useful Improvements in Saw Straightening and Stretching Machines, of which the following is a full, clear, and exact description, that will enable others to make and use the same, reference being had to the accompanying drawings, forming a part of this specification.

The object of this invention is to provide a machine for straightening and stretching sawblades, and is more especially intended for band-saws, but will operate equally as well on all straight saws.

It is a well-known fact that saws, while in use, are subjected to a greater strain on the toothed or cutting edge than on the back. Thus the cutting-edge becomes longer and does imperfect work. This being the case, it is necessary to provide some means whereby the back of the saw may be stretched and straightened from time to time, as may be required. This work is accomplished by my improved machine, which subjects the saw to a uniform mechanical operation, and entirely dispenses with the process of hammering, which at best is irregular and unsatisfactory.

Figure 1:
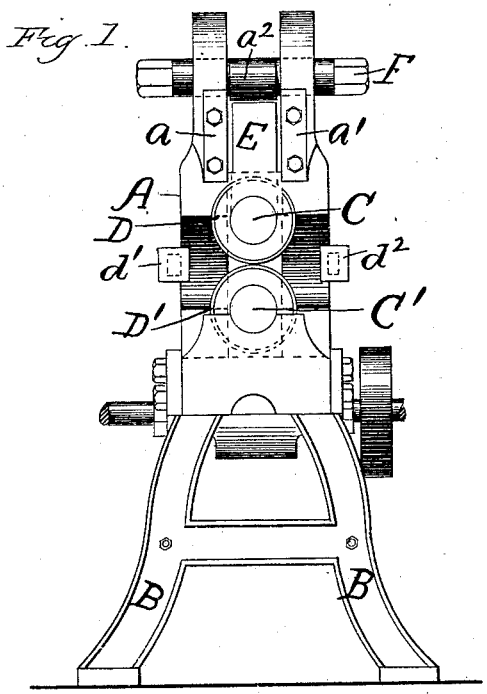
Figure 2:
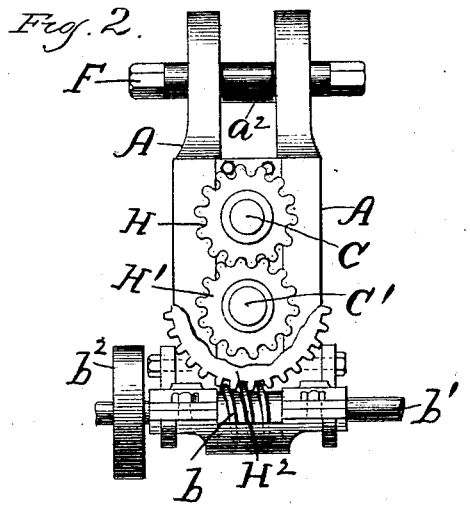
Figure 3:
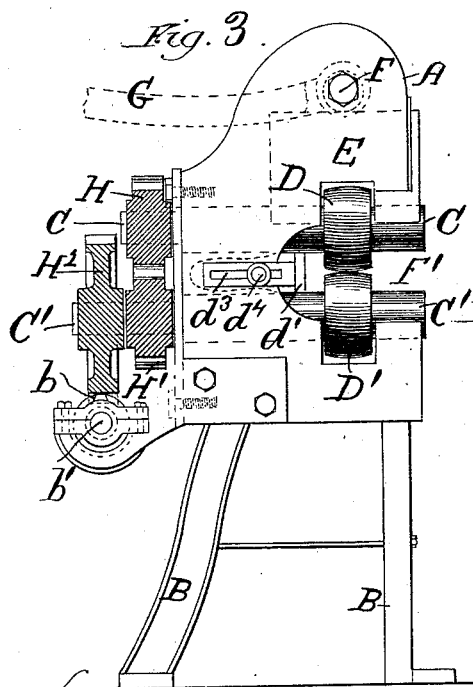
Figure 5:
Figure 6:
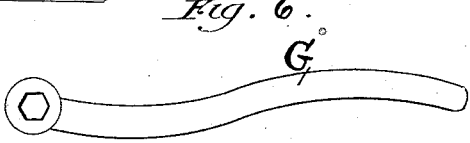

Figure 1 is a front elevation; Fig. 2, a rear elevation; Fig. 3, a side elevation, and Figs. 4, 5, and 6 detached details.

Referring to the drawings, A represents the body or frame of the machine, and B the legs supporting the same.

C C' are two shafts placed one above the other, and provided with suitable bearings in the upper and lower parts of the body A. These shafts are provided near the front ends with the beveled steel rolls D D'.

The upper shaft, C, is provided with the adjustable bearing-block E, which is retained in its proper place by the guide-plates $a\ a'$, bolted to the body of the machine. Above this adjustable bearing-block is located the operating cam-shaft F, having the cam $a^2$, which is adapted to have a light or heavy pressure on the movable bearing-block E, in accordance with the distance that the cam-shaft is to be rotated. This movement in turn forces down the upper adjustable shaft, C, and brings the faces of the steel rolls together.

The cam-shaft is operated by means of the lever G, which enables the operator to conveniently vary the pressure on the saw or the object placed between the faces of the steel rolls.

The spur-wheel H is mounted on the rear end of the upper or adjustable shaft, C, and is adapted to engage with the companion spurwheel, H', mounted on the lower shaft, C'.

The worm-wheel $H^2$ is mounted on the rear extended end of the lower shaft, C', and engages with the worm $b$ on the driving-shaft $b'$.

$b^2$ is a driving-pulley mounted on one end of the driving or worm shaft $b'$, which may have suitable connection with the motive power. By this arrangement the necessary motion is transmitted to the rolls, rotating the same in opposite directions.

The spring $d$ (shown in Fig. 5 and indicated by dotted lines in Fig. 3) is placed between the shafts C C', and serves the purpose of automatically spreading the rolls far enough apart to slip out the saw when the pressure of the cam-shaft is relaxed.

The adjustable guides $d'\ d^2$ are placed back of the rolls D D' and on each side of the machine, as shown in Fig. 1. These guides are provided with the elongated slot $d^3$, through which passes the clamping-bolt $d^4$, securing the guides in position relative to each other. These guides are intended to be brought in contact with the back edge of the saw during the time that the same is passing between the rolls, so as to uniformly keep the saw in the required position while being operated upon.

The opening F' between the front ends of the shafts C C' is a very important feature in machines of this character, as it conveniently admits of a band or endless saw being inserted between the rolls without the necessity of having to cut the saw in two.

Figure 4:
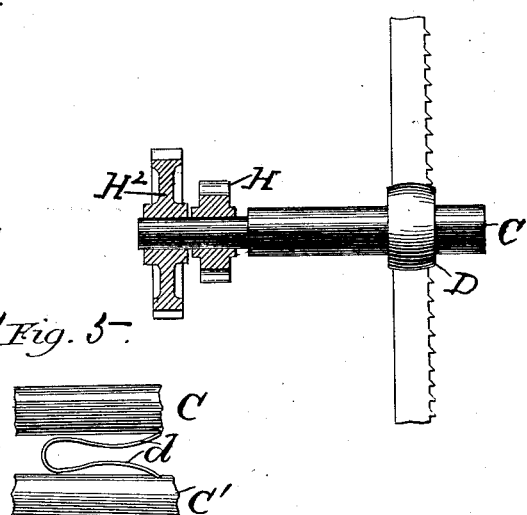

Fig. 4 shows the relative position of the saw and rolls during the operation.

This arrangement and form of construction provide a powerful machine which is easily operated, and the application of the pressure to the rolls being positive and direct, the machine is enabled to perform its work with facility.

Having thus described my invention, what I claim as new, and desire to secure by Letters Patent, is—

1. In a saw straightening and stretching machine, the combination, with a cam-shaft, of an adjustable bearing-block, an adjustable shaft, a companion shaft located underneath said adjustable shaft, both shafts being provided with beveled rolls adapted to have frictional contact with each other, and the means inserted between said shafts whereby the upper or adjustable shaft is automatically returned to a normal position when released from the pressure of the cam-shaft, substantially as and for the purpose set forth.

2. A saw straightening and stretching machine having the opening F' between the shafts C C', whereby a band or endless saw may be inserted between the rolls D D', substantially as set forth.

3. In a saw straightening and stretching machine, the combination, with the shafts C C', of the beveled rolls D D', the spur-wheels H H', the worm-wheel $H^2$, the worm $b$, and the driving-shaft $b'$, substantially as set forth.

4. The combination, with the shafts C C' and the rolls D D', of the adjustable guides $d'$ $d^2$, substantially as and for the purpose set forth.

ANDREW E. HOFFMAN.

Witnesses:
JNO. W. SALE,
E. G. SHULZE.